(12) United States Patent
Hagiuda et al.

(10) Patent No.: US 6,546,204 B2
(45) Date of Patent: Apr. 8, 2003

(54) DEVICE AND CAMERA ACCESSORY MOUNTED ON ACCESSORY SHOE

(75) Inventors: Nobuyoshi Hagiuda, Yokohama (JP); Masakuni Ohta, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/057,883

(22) Filed: Jan. 29, 2002

(65) Prior Publication Data

US 2002/0168185 A1 Nov. 14, 2002

(51) Int. Cl.$^7$ ............................................. G03B 15/03
(52) U.S. Cl. ..................................................... 396/155
(58) Field of Search ................................. 396/155, 198, 396/180

(56) References Cited

U.S. PATENT DOCUMENTS

| | | | | |
|---|---|---|---|---|
| 3,887,289 A | * | 6/1975 | Smart | 396/155 X |
| 3,914,779 A | * | 10/1975 | Terunuma | 396/198 X |
| 4,251,147 A | * | 2/1981 | Sugimori et al. | 396/198 |
| 4,666,276 A | * | 5/1987 | Chan | 396/180 |
| 5,630,183 A | * | 5/1997 | Hagiuda et al. | 396/198 X |

FOREIGN PATENT DOCUMENTS

| | | | |
|---|---|---|---|
| JP | 62-123435 | 6/1987 | G03B/15/05 |
| JP | 1-16085 U | 5/1989 | G03B/15/03 |
| JP | 4-50840 U | 4/1992 | G03B/17/56 |
| JP | 9-43683 | 2/1997 | G03B/15/03 |

* cited by examiner

Primary Examiner—W. B. Perkey

(57) ABSTRACT

A device that is to be fitted to an accessory shoe provided to a main device, includes: an insertion portion that is inserted into the accessory shoe; a shift member; an actuation member; and a shift device that shifts the shift member according to actuation of the actuation member, and the shift device: presses a portion of the shift member against an inner wall surface of the accessory shoe according to actuation of the actuation member, when the insertion portion is to be inserted and fixed in the accessory shoe; and releases this pressing of the portion of the shift member against the inner wall surface of the accessory shoe according to actuation of the actuation member in order to remove the insertion portion from the accessory shoe.

10 Claims, 16 Drawing Sheets

$V1 = Ic \cdot R = I1 \cdot R$
$V2 = (Ic + Id) \cdot R = (I1 + I2) \cdot R$
$V3 = Id \cdot R = I2 \cdot R$

DEVICE AND CAMERA ACCESSORY MOUNTED ON ACCESSORY SHOE

INCORPORATION BY REFERENCE

The disclosure of the following priority application is herein incorporated by reference: Japanese Patent Application No. 2001-021123, filed Jan. 30, 2001.

BACKGROUND OF THE INVENTION

1. Field of the Invention

The present invention relates to a device and to a camera accessory which are mounted upon an accessory shoe which is provided to a main device.

2. Description of the Related Art

There is a per se known type of flash device which is fitted during use to a hot shoe of a camera, such as, for example, the one disclosed in Japanese Laid Open Patent Publication No. H9-43683. With this flash device, a lock nut is disposed upon a leg portion of the flash device. And, with the leg portion inserted into the hot shoe, a specially provided lock pin is projected from the leg portion by rotating the lock nut, and this lock pin engages into a pin hole which is specially provided in the hot shoe.

However, with this type of prior art flash device, it is necessary to form a pin hole in the hot shoe in a position which corresponds to the lock pin in the leg portion of the flash device in order to fix the flash device to the hot shoe of the camera, and the problem arises that it is difficult to fix the flash device to a conventional camera in the hot shoe of which no such pin hole is provided.

Furthermore, with another prior art which is disclosed in Japanese Laid Open Patent Publication No. S62-123435, a method is proposed of not providing any dedicated lock pin or lock hole, but instead fixing the flash device to the hot shoe of the camera by pressing it against the external upper surface thereof and thereby engaging it thereto by friction; but in this case it is not possible to anticipate any secure and strong fixing action, since there is a danger that this external surface of the camera may be damaged or dirty.

SUMMARY OF THE INVENTION

Accordingly, it is the objective of the present invention to provide a device which can be fixed easily and securely to an accessory shoe which is provided to a main device. In particular, it is the objective of the present invention to provide a camera accessory such as a flash device or the like, which can be fixed easily and securely to an accessory shoe of a camera.

In order to attain the above objective, a device according to the present invention that is to be fitted to an accessory shoe provided to a main device, comprises: an insertion portion that is inserted into the accessory shoe; a shift member; an actuation member; and a shift device that shifts the shift member according to actuation of the actuation member, and the shift device: presses a portion of the shift member against an inner wall surface of the accessory shoe according to actuation of the actuation member, when the insertion portion is fixed after insertion in the accessory shoe; and releases this pressing of the portion of the shift member against the inner wall surface of the accessory shoe according to actuation of the actuation member in order to remove the insertion portion from the accessory shoe.

In this device, it is preferred that: the actuation member is provided so as to be rotatable; and the shift device comprises a biasing member that biases the shift member towards the accessory shoe, and an actuation shaft that is linked to and is rotated by the actuation member and has a displacement portion; and, due to shifting of the displacement portion according to rotation of the actuation shaft, shifts the shift member away from the accessory shoe to press the portion of the shift member against an upper inner wall surface of the accessory shoe. In this case, it is preferred that the shift device further comprises a support member to which a tip portion of the actuation shaft is engaged and which is contacted to an upper surface of the insertion portion.

Also, it is preferred that: the actuation member is provided so as to be rotatable; and the shift device comprises a biasing member that biases the shift member away from the accessory shoe, and an actuation shaft that is linked to and is rotated by the actuation member and has a displacement portion, and, due to shifting of the displacement portion according to rotation of the actuation shaft, shifts the shift member towards the accessory shoe to press the portion of the shift member against a lower inner wall surface of the accessory shoe.

Also, it is preferred that the portion of the shift member comprises a projecting portion that contacts an inner wall surface of the accessory shoe when being pressed.

Also, it is preferred that: the shift member comprises a first shift member and a second shift member; the actuation member is provided so as to be rotatable; and the shift device comprises a first biasing member that biases the first shift member towards the accessory shoe, a second biasing member that biases the second shift member away from the accessory shoe, and an actuation shaft that is linked to and is rotated by the actuation member and has a displacement portion, and the shift device, due to shifting of the displacement portion according to rotation of the actuation shaft, shifts the first shift member away from the accessory shoe to press a portion of the first shift member against an upper inner wall surface of the accessory shoe, and shifts the second shift member towards the accessory shoe to press a portion of the second shift member against a lower inner wall surface of the accessory shoe. In this case, it is preferred that the shift device further comprises a support member to which a tip portion of the actuation shaft is engaged and which is contacted to an upper surface of the insertion portion.

A camera accessory according to the present invention that is to be fitted to an accessory shoe provided to a camera, comprises: an insertion portion that is inserted into the accessory shoe; a shift member; an actuation member; and a shift device that shifts the shift member upon actuation of the actuation member, and the shift device: presses a portion of the shift member against an inner wall surface of the accessory shoe according to actuation of the actuation member, when the insertion portion is fixed after insertion in the accessory shoe; and releases this pressing of the portion of the shift member against the inner wall surface of the accessory shoe according to actuation of the actuation member in order to remove the insertion portion from the accessory shoe. In this case, it is preferred that the camera accessory is a flash device. Furthermore, it is preferred that the shift member is formed from a metallic material that is electrically conductive, and a standard potential line is connected to the shift member.

DESCRIPTION OF THE PREFERRED EMBODIMENTS

In the following, several preferred embodiments of the present invention will be explained in detail with reference to the drawings.

First Embodiment

Figure 1:
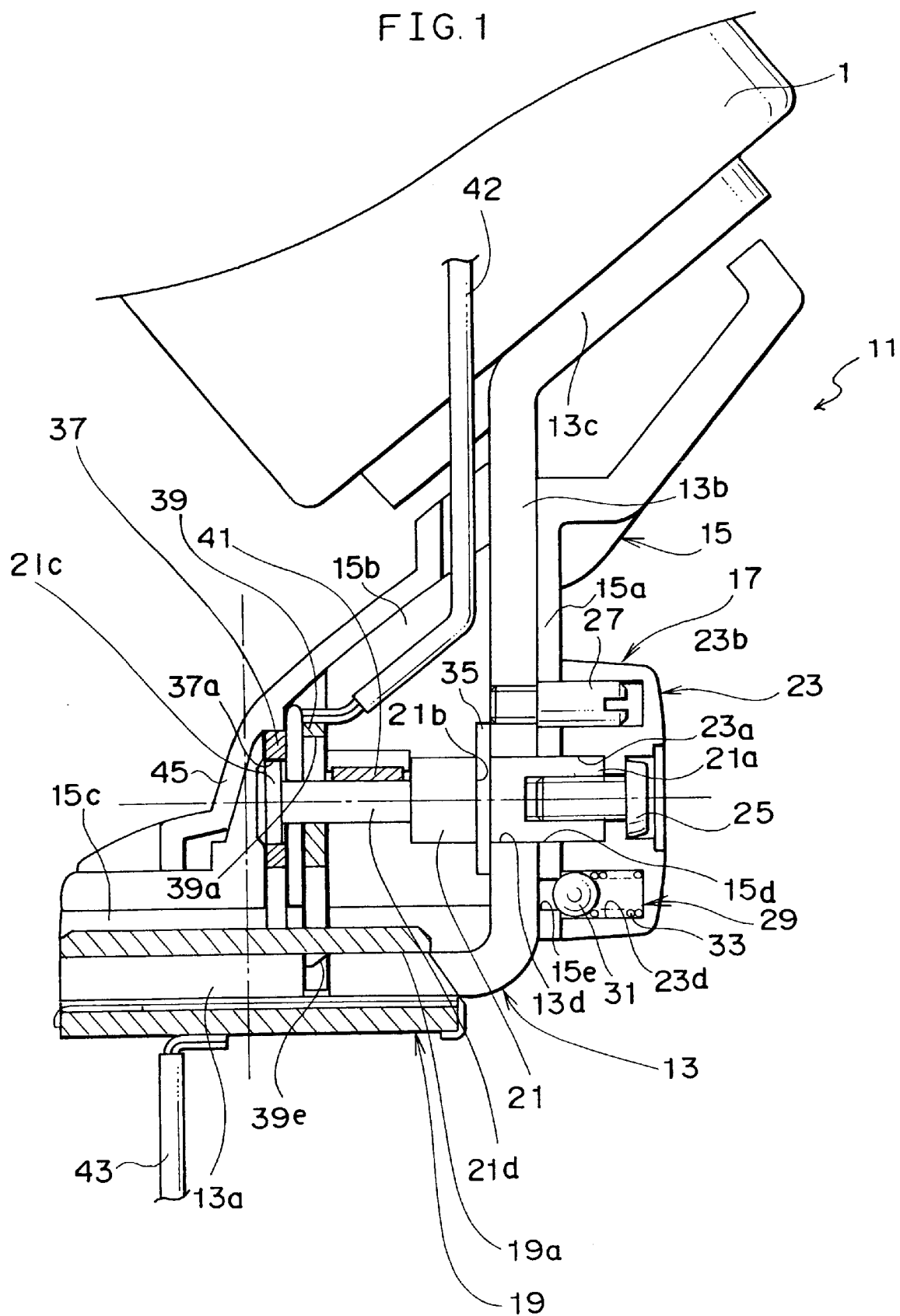
FIG. 1 is a sectional view showing a first preferred embodiment of the flash device according to the present invention in the released state.
Figure 2:
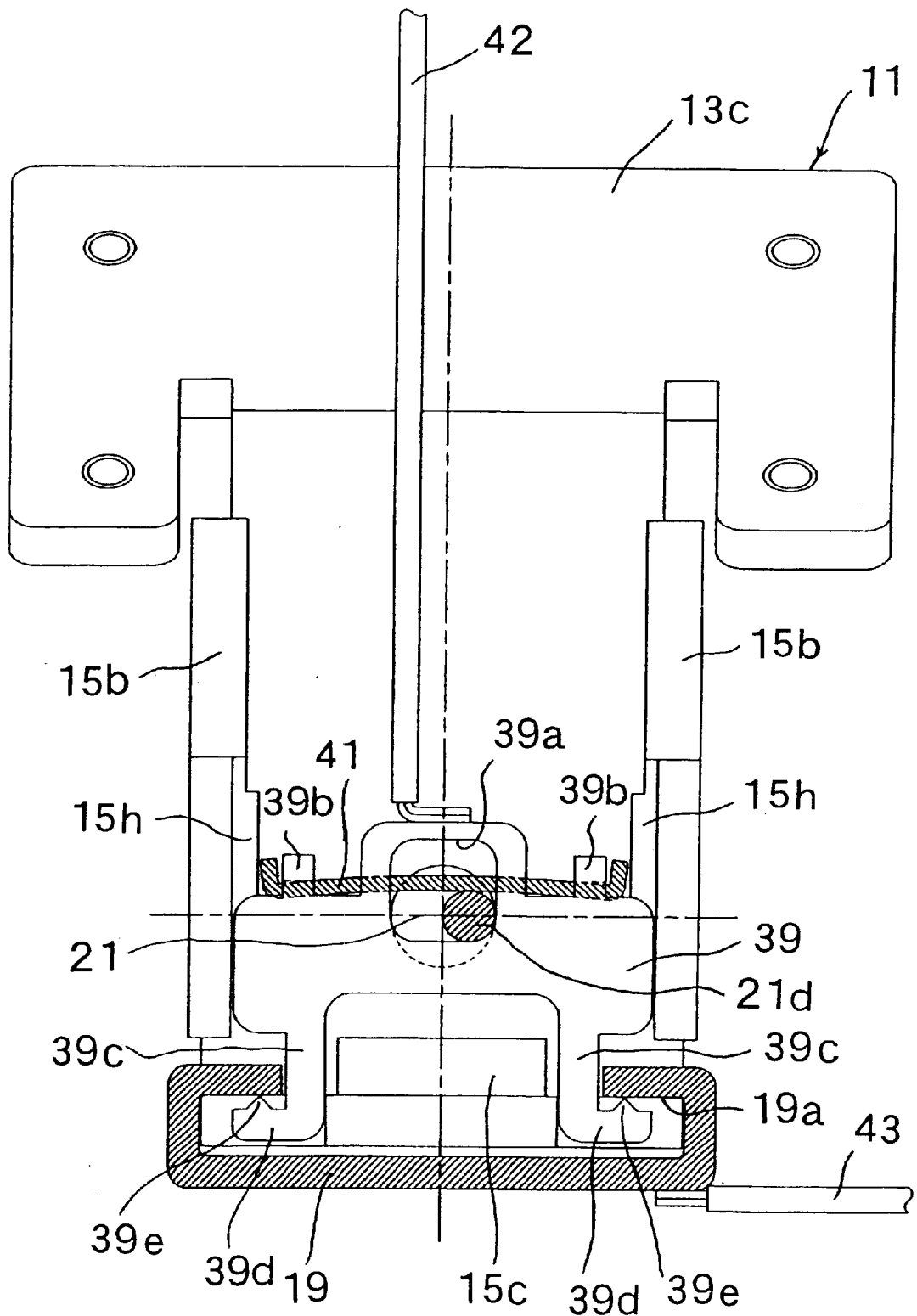
FIG. 2 is a sectional view showing a shift member of FIG. 1 and its vicinity in the released state.
Figure 3:
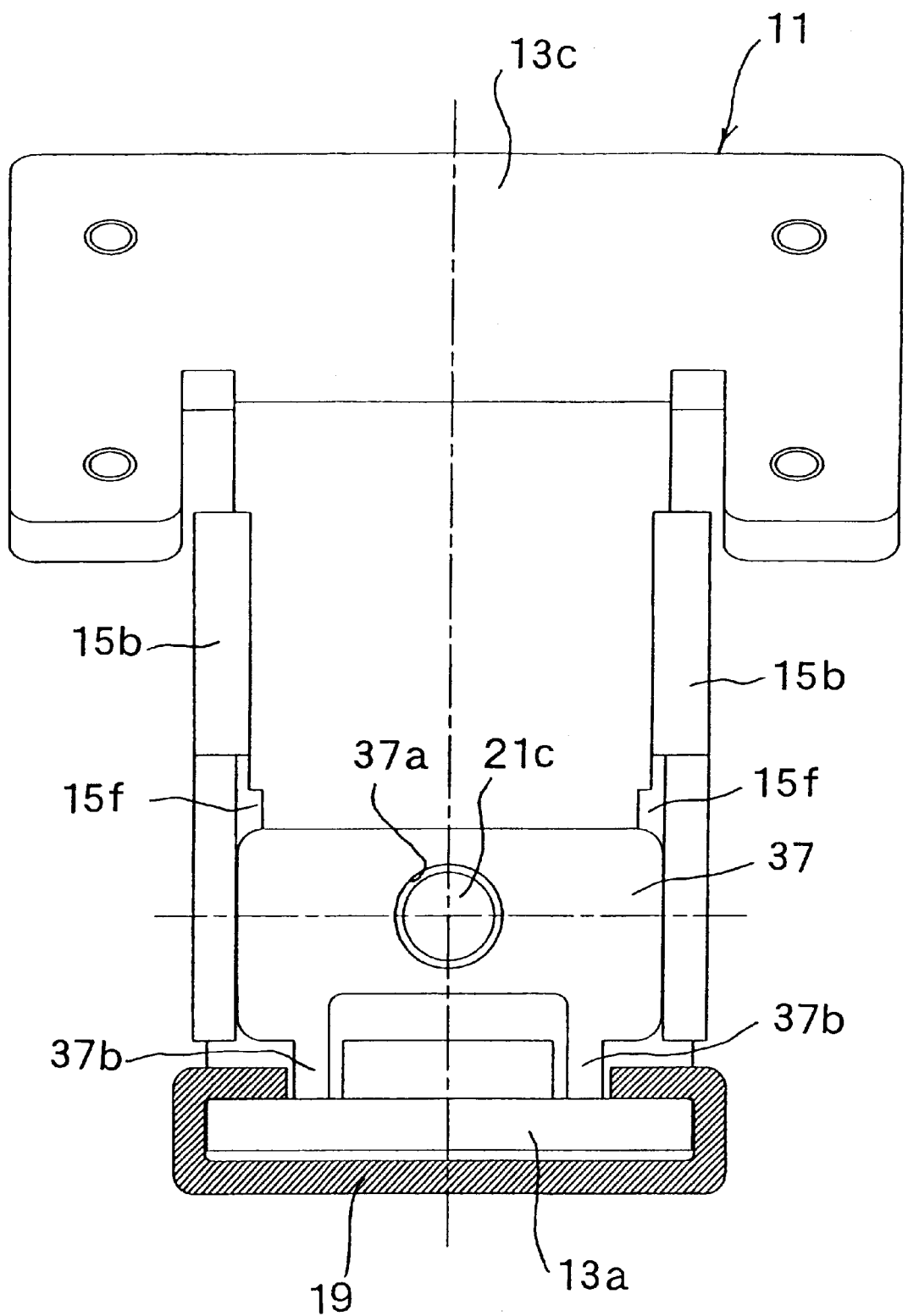
FIG. 3 is a sectional view showing a support member of FIG. 1 and its vicinity.
Figure 16:
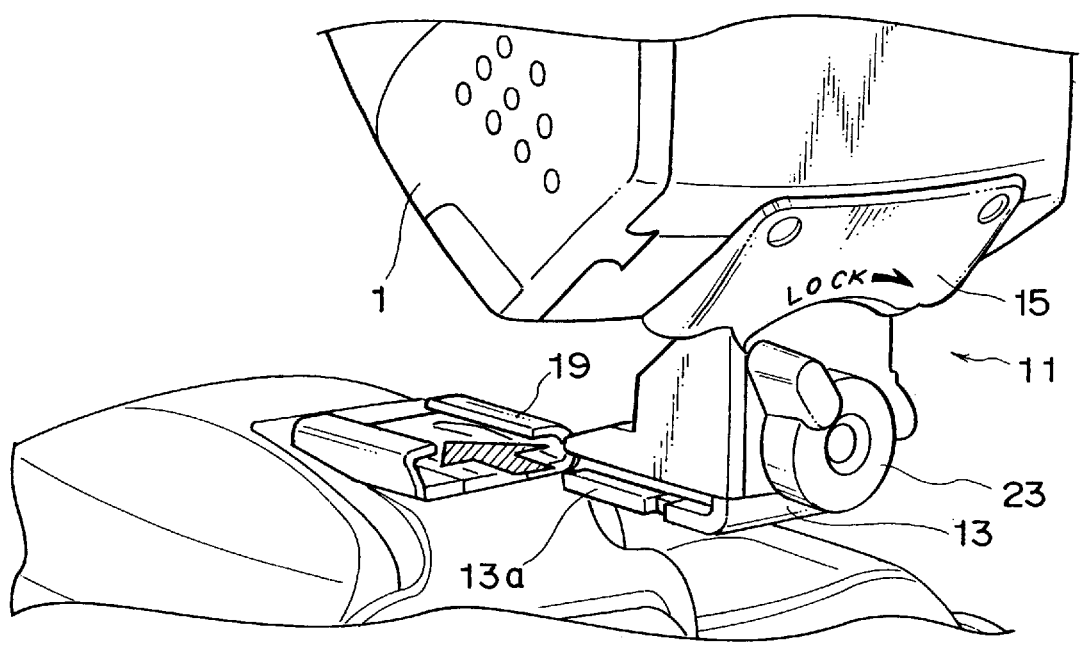
FIG. 16 is a perspective view showing the situation when the flash device of the present invention is being mounted to a hot shoe (an accessory shoe) of a camera.

FIGS. 1 through 3 show a first preferred embodiment of the flash device according to the present invention. In these figures the reference symbol 11 denotes a leg portion of the flash device. A main body portion 1 of the flash device is fixed to this leg portion 11. The leg portion 11 comprises a leg portion main body 13, a outer member 15, and an actuation means 17. FIG. 16 is a perspective view showing the situation when the flash device of the present invention is being mounted to a hot shoe (an accessory shoe) of a camera.

The leg portion main body 13 is made from a metallic material such as steel, brass, or the like. And this leg portion main body 13 comprises an insertion portion 13a which is inserted into a hot shoe 19 of a camera, and a support portion 13b which is formed integrally with this insertion portion 13a and extends perpendicularly thereto. The upper portion of this support portion 13b is bent through a certain angle, and constitutes a fixing portion 13c to which the main body portion 1 of the flash device is fixed.

An outer member 15 is fitted to the outer side of the leg portion main body 13. This outer member 15 is formed from a resin material. The outer member 15 comprises three members 15a, 15b, and 15c, whereof a rear face portion 15a covers over the outer side of the support portion 13b of the leg portion main body 13, while two side face portions 15b are formed integrally with and extend from both sides of this rear face portion 15a.

And the side face portions 15b are positioned so as to confront each other on both sides of the insertion portion 13a of the leg portion main body 13. Moreover, a bottom face portion 15c is formed between these side face portions 15b. An actuation means 17 comprises an actuation shaft 21 which is arranged to extend approximately in parallel with the insertion portion 13a of the leg portion main body 13, and an actuation member 23 for rotationally driving this actuation shaft 21.

The actuation shaft 21 is rotatably fitted through a through hole 13d which is formed in the support portion 13b of the leg portion main body 13 and a through hole 15d which is formed in the rear face portion 15a of the outer member 15. And this actuation shaft 21 projects from the rear face portion 15a of the outer member 15, with the actuation member 23 being fixed to this projecting portion 21a.

A hole portion 23a is formed in the actuation member 23, and the projecting portion 21a of the actuation shaft 21 passes through and is supported by this hole portion 23a. And the actuation member 23 is fixed to this projecting portion 21a of the actuation shaft 21 by a screw 25. A guide groove 23b is formed on the back surface of the actuation member 23.

Figure 4:
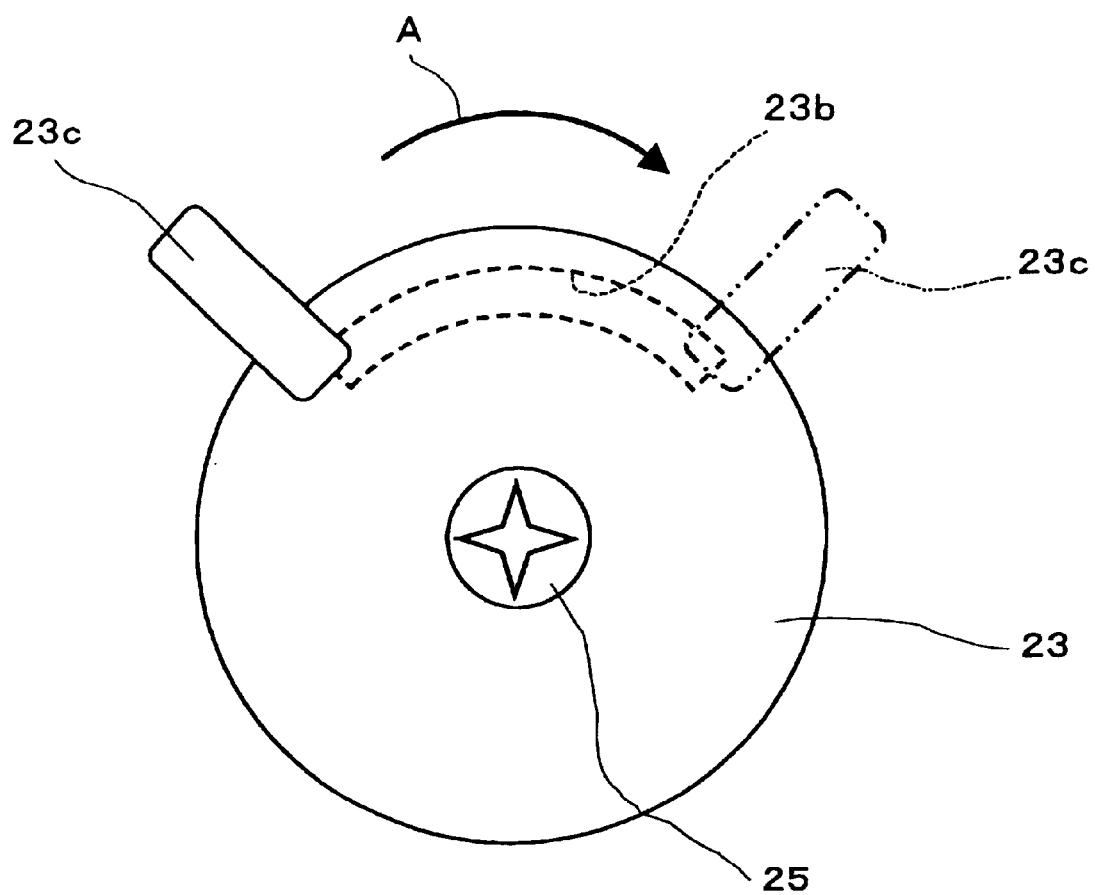
FIG. 4 is a front elevation view showing an actuation member of FIG. 1 and its vicinity.

This guide groove 23b is formed in a circular arc shape around an angle of 90° at a prescribed radius from the central axis of the actuation member 23, as shown in FIG. 4. A pin member 27 is inserted in the guide groove 23b, and this pin member 27 is fixed to the support portion 13b of the leg portion main body 13. Accordingly, the actuation member 23 is allowed to rotate from one end of the guide groove 23b to the other with the angle of 90°.

Furthermore, a click mechanism 29 is provided on the rear surface of the actuation member 23. This click mechanism 29 comprises a hole portion 23d which is formed in the actuation member 23, and a ball 31 and a coil spring 33 which are housed in this hole portion 23d. And the rear face portion 15a of the outer member 15 is formed with two hole portions 15e into which the ball 21 is biased by the action of the coil spring 33, thus providing a click action.

The two hole portions 15e are formed spaced apart by an angle of 90° upon the rear face portion 15a of the outer member 15, and the click action is performed in the vicinity of the positions in which the pin member 27 contacts against the one end and the other end of the guide groove 23b of the actuation member 23. As shown in FIG. 4, a finger engagement portion 23c is formed integrally upon the outer circumference of the actuation member 23.

And, when this finger engagement portion 23c is positioned at the left end of the guide groove 23b, then the engagement of the flash device to the hot shoe 19 is released. On the other hand, when the finger engagement portion 23c is positioned at the right end of the guide groove 23b, then the engagement of the flash device to the hot shoe 19 is secured.

A ring shaped groove 21b is formed upon the actuation shaft 21 at the axial position at which the inner side of the support portion 13b of the leg portion main body 13 lies. An E-ring 35 is fitted into this ring shaped groove 21b, so as to prevent the actuation shaft 21 from coming out from the support portion 13b. An engagement portion 21c is formed upon the tip of the actuation shaft 21, positioned within the leg portion 11.

This engagement portion 21c is engaged into a through hole 37a formed in a support member 37 which is made from a metallic material. This support member 37, as shown in FIG. 3, is formed in a rectangular shape. And both its side edge portions are shiftably inserted into groove portions 15f which are formed in the side face portions 15b of the outer member 15 and extend in the vertical direction.

Projecting portions 37b are formed upon the lower portion of the support member 37, spaced apart with a certain gap between them in the horizontal direction, and the lower surfaces of these projecting portions 37b contact the upper surface of the insertion portion 13a. A cam portion 21d, which constitutes a displacement portion, is formed on the actuation shaft 21, inward of the engagement portion 21c. This cam portion 21d is inserted through a through hole 39a of a shift member 39.

This shift member 39 is rectangular, as shown in FIG. 2. And both its edge portions are inserted into groove portions 15h which are formed in the side face portions 15b of the outer member 15, so that it is slidable in the vertical direction. A rectangular through hole 39 is formed in the upper portion of the shift member 39, and the cam portion 21d of the actuation shaft 21 is passed through this through hole 39.

The cam portion 21d is formed to be circular in cross sectional shape, having a diameter which corresponds to the radius of the actuation shaft 21, and is positioned eccentrically on a one half side of the actuation shaft 21. In other words, in this first preferred embodiment of the present invention, the central axis of the actuation shaft 21 extending in the horizontal direction and the central axis of the cam portion 21d extending in the horizontal direction are positioned so as to coincide with one another; while, the cam portion 21d is positioned between the central axis of the actuation shaft 21 and the outer periphery of said actuation shaft 21.

And a plate spring 41, which constitutes a biasing means, is arranged so as to pass across the through hole 39a. Holding members 39b are formed on both sides of the upper portion of the shift member 39, and the two sides of the plate spring 41 are held by these holding members 39b. Moreover, projecting portions 39c are formed on the lower portion of the shift member 39, spaced apart by a certain gap in the horizontal direction.

The tips of these projecting portions 39c are bent towards the outside, so as to lie within the hot shoe 19. And projecting portions 39e are formed on the upper surfaces of these outwardly bent portions 39d, so as to project towards and to confront the upper inner wall surfaces 19a of the hot shoe 19. These projecting portions 39e are formed as triangular.

It should be noted that these projecting portions might alternatively be, for example, formed as semicircular. The shift member 39 is formed from a metallic material which conducts electricity. And a power line 42 at standard potential is connected to the upper end of the shift member 39. Furthermore, a power line 43 at standard potential on the camera side is connected to the lower surface of the hot shoe 19.

Moreover, in FIG. 1, the reference symbol 45 denotes a cover member on the main body portion side of the flash device.

Now the operation of the flash device described above will be explained. With the above described flash device, when the finger engagement portion 23 is positioned to the left end of its travel as shown in FIG. 4, then the engagement of the flash device to the hot shoe 19 is in the released state.

And, in this released state, as shown in FIGS. 1 and 2, the cam portion 21d of the actuation shaft 21 is positioned at the side of the central axis of the actuation shaft 21. And the shift member 39 is shifted in the downward direction by the cam portion 21d, so that a predetermined gap is created between the upper inner wall surfaces 19a of the hot shoe 19 and the projecting portions 39e of the shift member 39.

Figure 5:
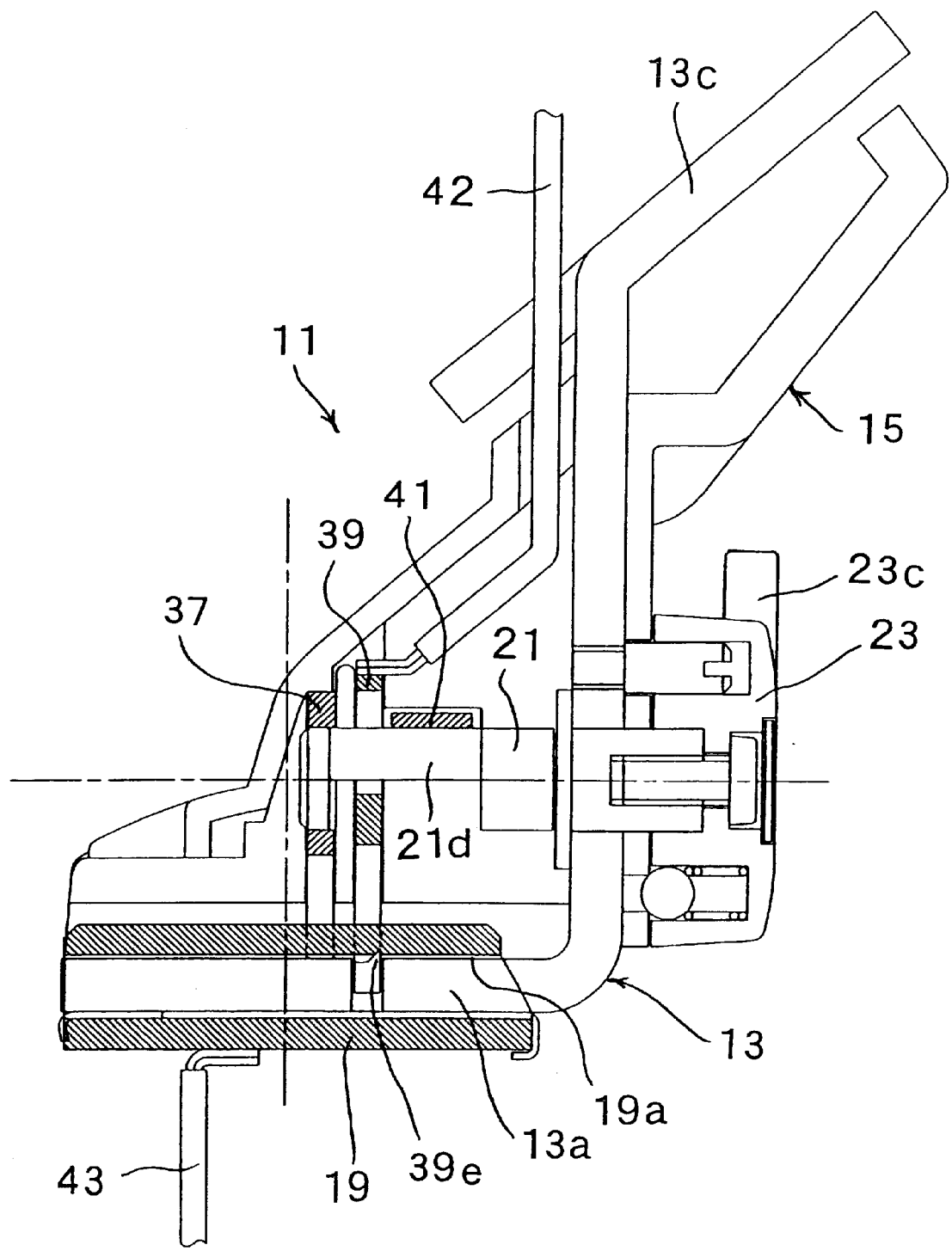
FIG. 5 is a sectional view showing the flash device of FIG. 1 in the engaged state.
Figure 6:
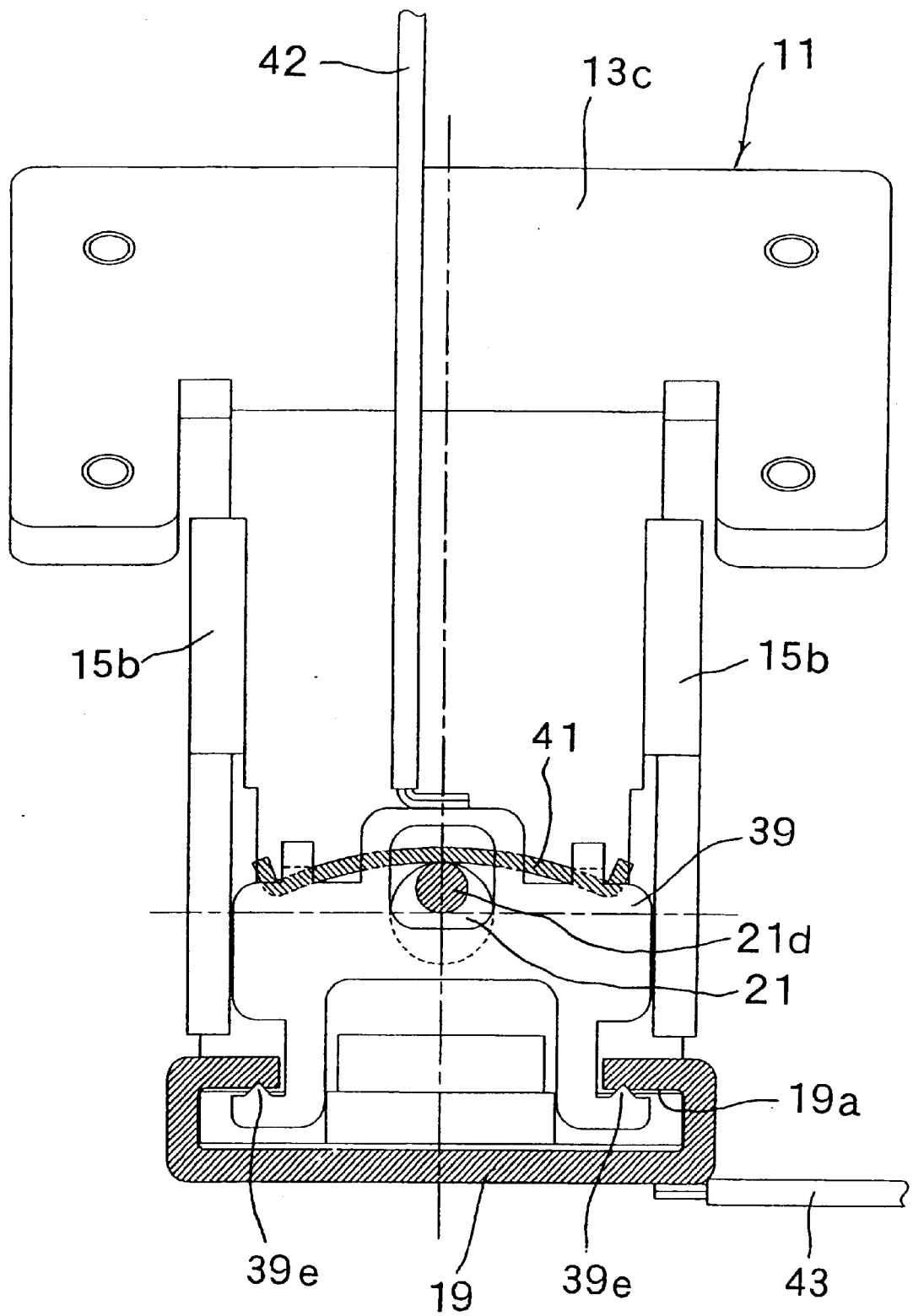
FIG. 6 is a sectional view showing the shift member of FIG. 1 and its vicinity in the engaged state.

Accordingly, in this state, the leg portion 11 can be freely fitted to the hot shoe 19. And, when the finger engagement portion 23c is shifted from this state through an angle of 90° in the direction shown by the arrow symbol A in FIG. 4, so that the finger engagement portion 23c is positioned to the right end of its travel in that figure, then at this time the engaged state of the flash device to the hot shoe 19 is established. In this engaged state, which is shown in FIGS. 5 and 6, the cam portion 21d of the actuation shaft 21 is positioned above the central axis of the actuation shaft 21.

And the center of the plate spring 41 is shifted upwards by the cam portion 21d, so that the shift member 39 is shifted in the upwards direction via the plate spring 41. And the projecting portions 39e of the shift member 39 are pressed against the upper inner wall surfaces 19a of the hot shoe 19, so that thereby the leg portion 11 is securely fixed to the hot shoe 19. Furthermore, since in this engaged state the actuation shaft 21 is pressed in the downwards direction by the plate spring 41, accordingly the support member 37 shown in FIG. 1 is pressed against the upper surface of the insertion portion 13a of the leg portion main body 13, and thus the actuation shaft 21 is securely supported by this support member 37.

And, when from this engaged state the finger engagement portion 23c is shifted through an angle of 90° in the opposite rotational direction to that shown by the arrow symbol A in FIG. 4, so that this finger engagement portion 23c is positioned to the left end of its travel in that figure, then the released state of the flash device from the hot shoe 19 is established. Since with the above described flash device, when the leg portion 11 is mounted to the hot shoe 19, the projecting portions 39e of the shift member 39 are pressed against the upper inner wall surfaces 19a of the hot shoe 19, accordingly it is possible easily and securely to fix the leg portion 11 to the hot shoe 19 of the camera.

Furthermore, with the above described flash device, when the actuation shaft 21 is rotated, then the shift member 39 is shifted by the cam portion 21d of the actuation shaft 21 against the resistance of the biasing force of the plate spring 41 in the direction away from the hot shoe 19, so that the projecting portions 39e are pressed against the upper inner wall surfaces 19a of the hot shoe 19; and therefore it is possible easily and securely to fix the leg portion 11 to the hot shoe 19 of the camera.

Yet further, with the above described flash device, since it is arranged that the engagement portion 21c of the end of the actuation shaft 21 is engaged with the support member 37, and the support member 37 is contacted via the plate spring 41 against the upper surface of the insertion portion 13a and pressed against it, accordingly it is possibly securely to support the end of the actuation shaft 21 upon the upper surface of the insertion portion 13a via the support member 37. And since, in the engaged state, the end of the actuation shaft 21 is supported securely via the support member 37 upon the upper surface of the insertion portion 13a, and furthermore the cam portion 21d of the actuation shaft 21 is pressed by the plate spring 41, accordingly the actuation shaft 21 is in an extremely stable state, and it becomes possible to support the leg portion 11 securely, even if the accuracy of the engagement portions between the through hole 13d which is formed in the support portion 13b of the leg portion main body 13 and the actuation shaft 21 is low.

Moreover, with the above described flash device, since the shift member 39 is formed from a metallic material which is electrically conductive, and this shift member 39 is connected to the standard potential line 42, accordingly it is possible accurately to apply the same standard potential to the camera and the flash device. Furthermore, since the shift member 39, the actuation shaft 21, and the leg portion main body 13 are all made from a metallic material which is electrically conductive, and in the fixed state they are contacted together with a strong force, accordingly they are properly electrically connected together, so that it is also possible to lead off the standard potential line from the leg portion main body 13.

It should be noted that this matter will be explained in detail hereinafter.

Second Embodiment

Figure 7:
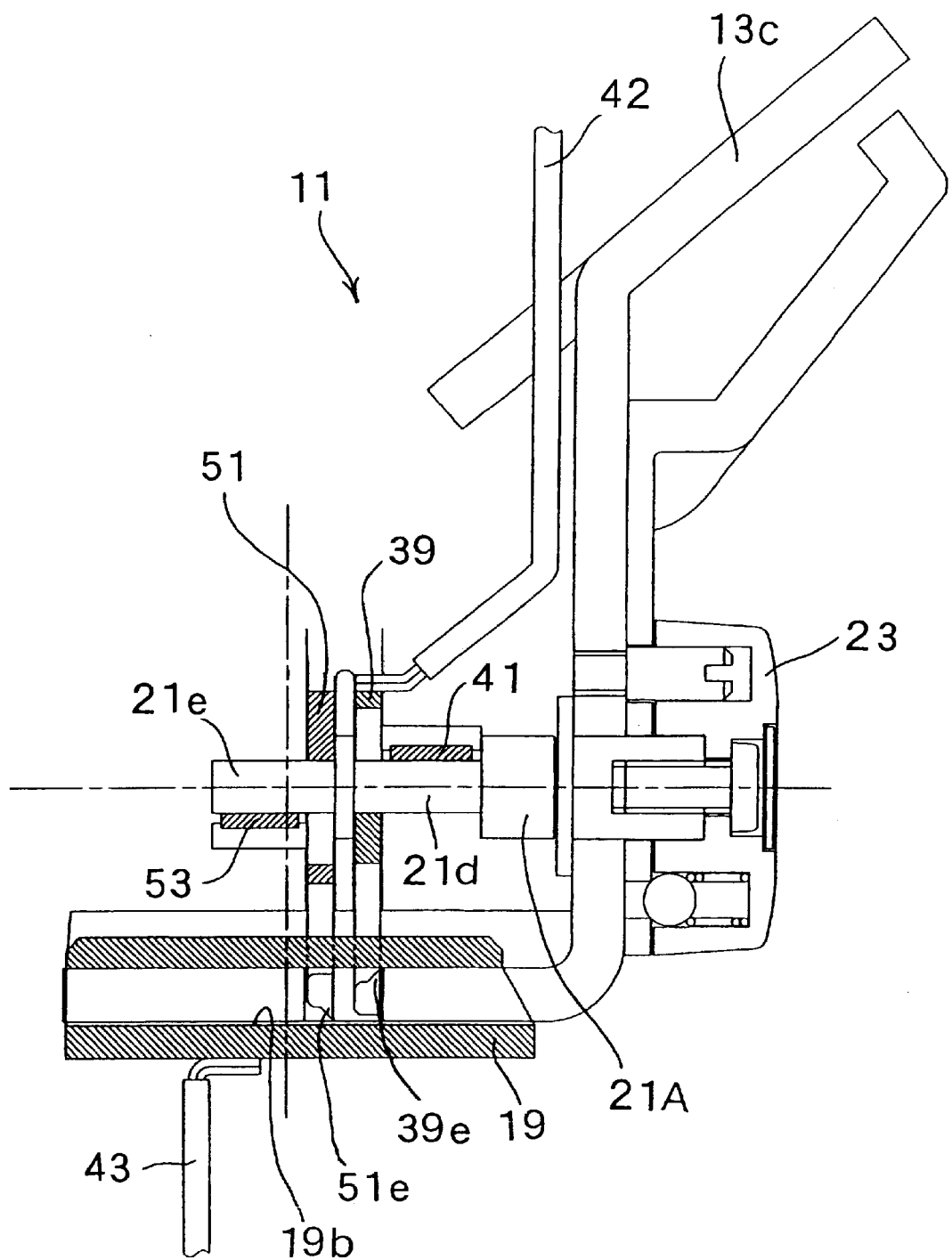
FIG. 7 is a sectional view showing a second preferred embodiment of the flash device according to the present invention in the released state.
Figure 8:
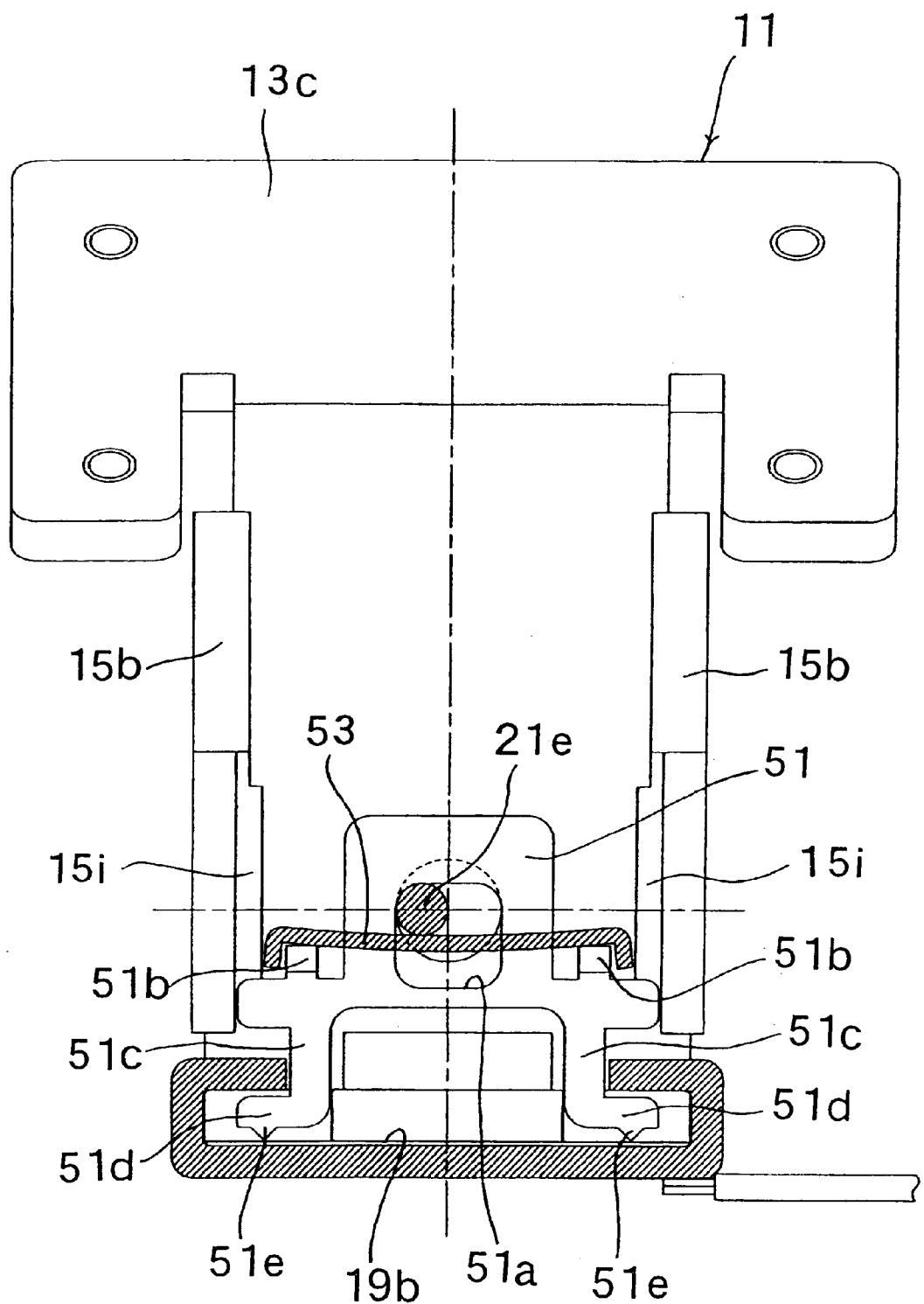
FIG. 8 is a sectional view showing a second shift member of FIG. 7 and its vicinity in the released state.

FIGS. 7 and 8 show a second preferred embodiment of the flash device according to the present invention. In this second preferred embodiment, a first shift member 39 and a second shift member 51 are provided within the leg portion 11.

Since the first shift member 39 in this second preferred embodiment of the present invention has the same structure as the shift member of the first preferred embodiment described above and is identical thereto, the same reference symbols will be appended to it, and its description will be curtailed. The second shift member 51 is arranged to be pressed towards the lower inner wall surface 19b of the hot shoe 19 by the rotation of the actuation shaft 21A.

In detail, as shown in FIG. 8, both the sides of this second shift member 51 can be inserted into groove portions 15i which are formed upon the side face portions 15b of the outer member 15, so as to be slidable therein in the vertical direction. And a through hole 51a which is rectangular in shape is formed in the upper portion of the second shift member 51, with a second cam portion 21e of the actuation shaft 21A being passed through this through hole 51a.

The second cam portion 21e has is formed to be circular in cross sectional shape, having a diameter which corresponds to the radius of the actuation shaft 21A, and is positioned eccentrically on the other one half side of the actuation shaft 21A, so as to be on the side of the axis thereof opposite to the first cam portion 21d. And a second plate spring 53, which constitutes a biasing means, is arranged so as to pass across the through hole 51a.

Holding members 51b are formed on both sides of the upper portion of the second shift member 51, and the two sides of the plate spring 53 are held on the upper surfaces of these holding members 51b. Moreover, projecting portions 51c are formed on the lower portion of the second shift member 51, spaced apart by a certain gap in the horizontal direction. The tips of these projecting portions 51c are bent towards the outside, so as to lie within the hot shoe 19.

And projecting portions 51e are formed on the lower surfaces of these outwardly bent portions 51d, so as to project towards and to confront the lower inner wall surface 19b of the hot shoe 19. These projecting portions 51e are formed as triangular. It should be noted that these projecting portions might alternatively be, for example, formed as semicircular. The second shift member 51 is formed from a metallic material which conducts electricity.

With this flash device according to the second preferred embodiment of the present invention, in the released state, as shown in FIGS. 7 and 8, the second cam portion 21e of the actuation shaft 21A is positioned at the side of the central axis of the actuation shaft 21A.

And the second shift member 51 is shifted in the upward direction by the second cam portion 21e, so that a predetermined gap is created between the lower inner wall surface 19b of the hot shoe 19 and the projecting portions 51e of the second shift member 51. Accordingly, in this state, the leg portion 11 can be freely fitted to the hot shoe 19. And, when the actuation member 23 is shifted from this state through an angle of 90°, then at this time the engaged state of the flash device to the hot shoe 19 is established.

Figure 9:
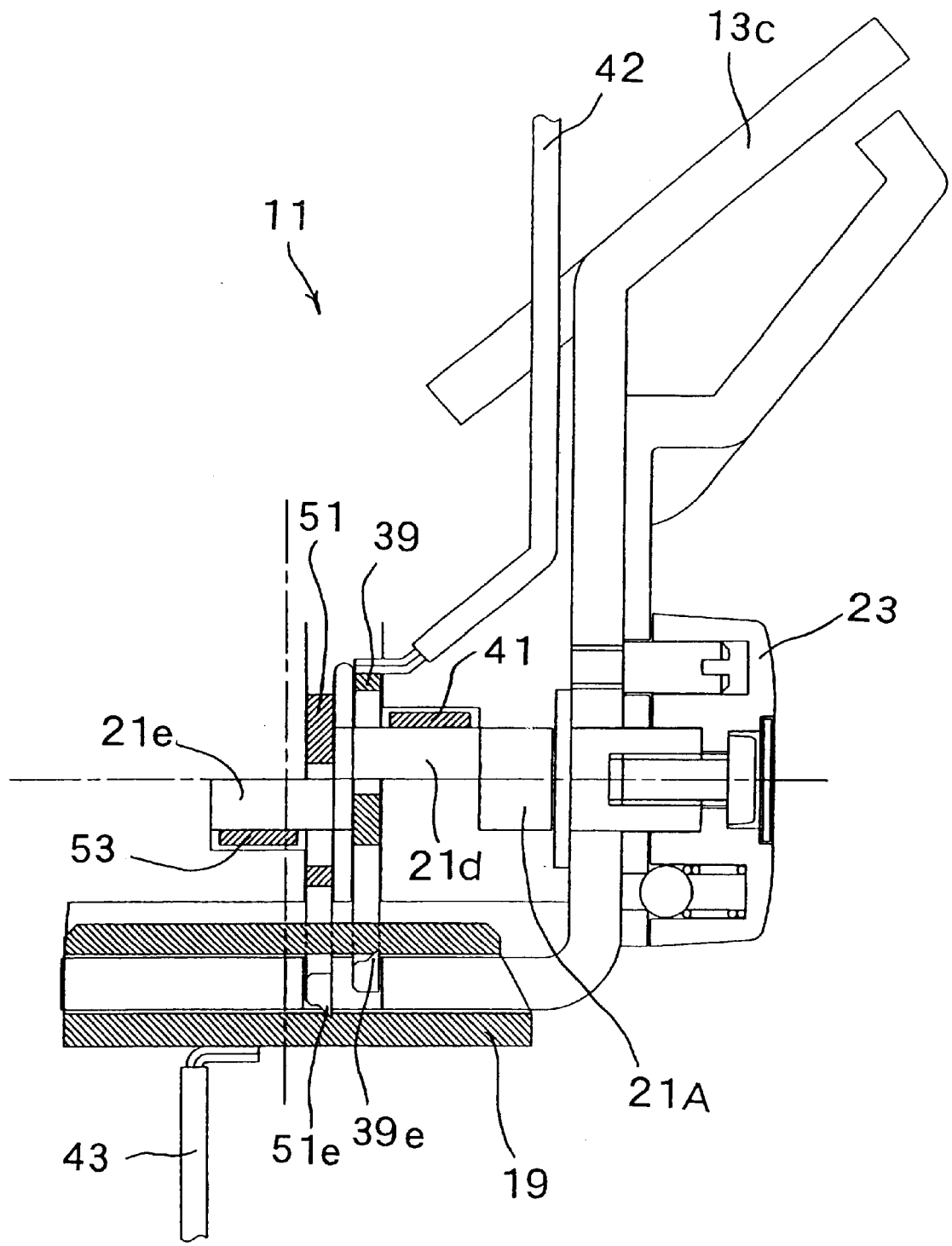
FIG. 9 is a sectional view showing the flash device of FIG. 7 in the engaged state.
Figure 10:
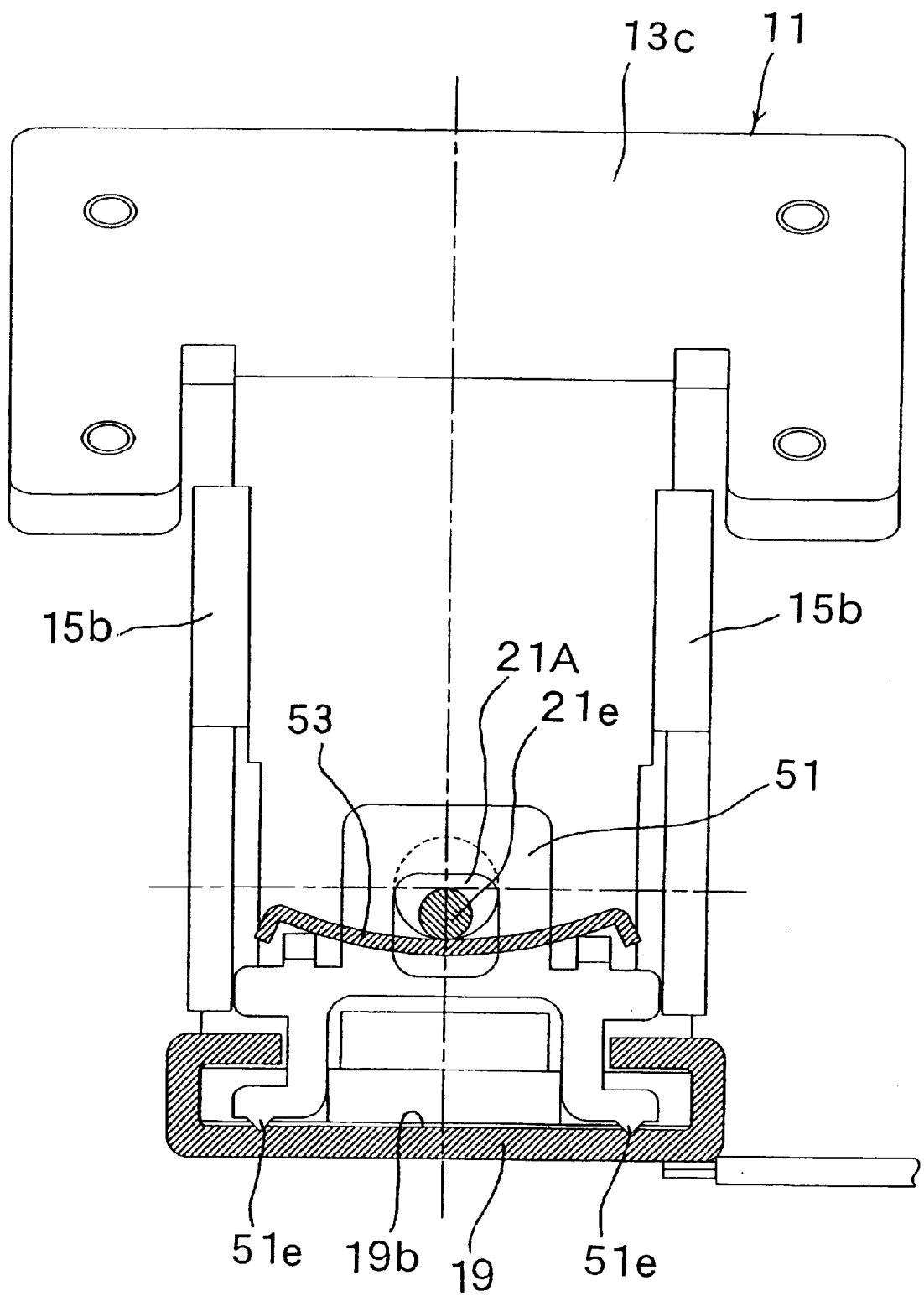
FIG. 10 is a sectional view showing the second shift member of FIG. 7 and its vicinity in the engaged state.

In this engaged state, which is shown in FIGS. 9 and 10, the second cam portion 21e of the actuation shaft 21A is positioned below the central axis of the actuation shaft 21A, and the center of the plate spring 53 is shifted downwards by the second cam portion 21e, so that the shift member 51 is shifted in the downwards direction via the plate spring 53. And the projecting portions 51e of the shift member 51 are pressed against the lower inner wall surface 19b of the hot shoe 19, so that thereby the leg portion 11 is securely fixed to the hot shoe 19.

Moreover, in this second preferred embodiment of the present invention, the operation of the first shift member 39 is the same as in the case of the first preferred embodiment described above, and accordingly description thereof will be curtailed. Since with the above described flash device according to the second preferred embodiment not only are the projecting portions 39e of the first shift member 39 pressed against the upper inner wall surfaces 19a of the hot shoe 19, but also the projecting portions 51e of the second shift member 51 are pressed against the lower inner wall surface 19b of the hot shoe 19, accordingly it is possible to fix the leg portion 11 of the flash device to the hot shoe 19 of the camera even more easily and securely than in the case of the first preferred embodiment described above.

Third Embodiment

Figure 11:
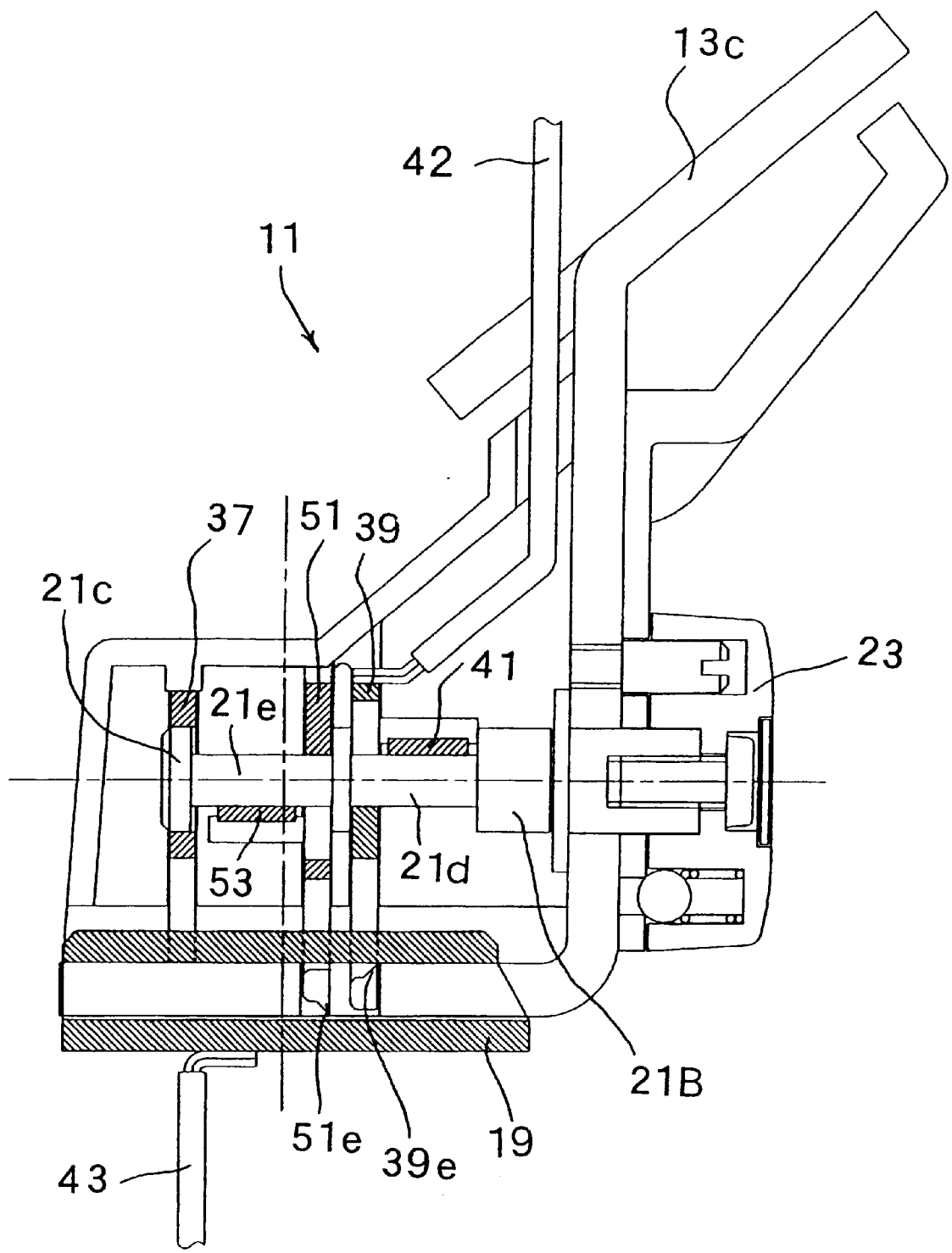
FIG. 11 is a sectional view showing a third preferred embodiment of the flash device according to the present invention in the released state.

FIG. 11 is a sectional view showing a third preferred embodiment of the flash device according to the present invention. In this third preferred embodiment, both a first shift member 39 and a second shift member 51 are disposed within the leg portion 11. Moreover, since the structures of this first shift member 39 and this second shift member 51 are the same as in the case of the second preferred embodiment described above, therefore the same reference symbols are affixed to the same elements thereof, and the description thereof will be curtailed.

Figure 12:
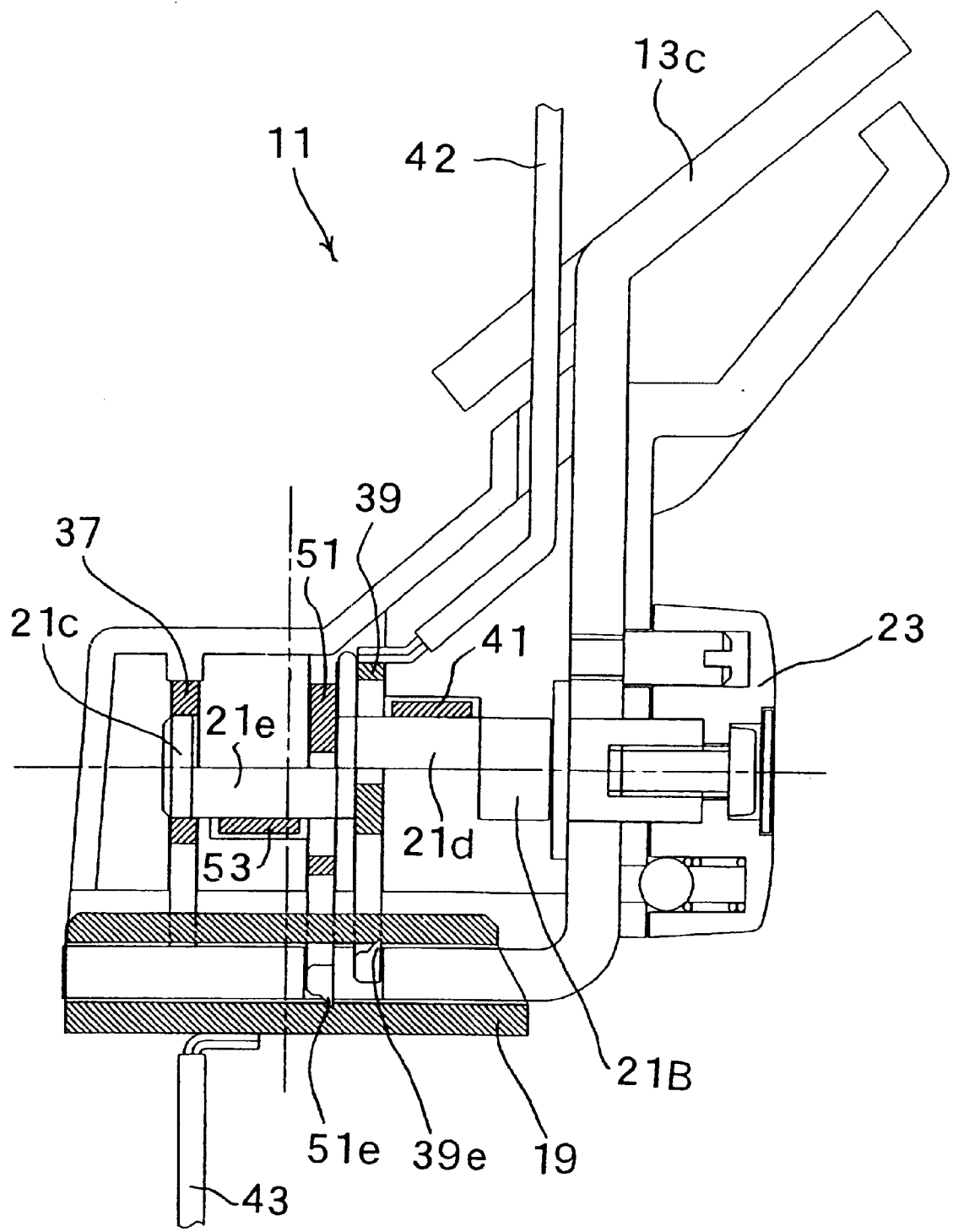
FIG. 12 is a sectional view showing the flash device of FIG. 11 in the engaged state.

And, in this third preferred embodiment, an engagement portion 21c is formed upon the end of the actuation shaft 21B, and this engagement portion 21c is engaged with the support member 37. It should be noted that, since the structure of this support member 37 is the same as in the case of the first preferred embodiment described above, therefore the same reference symbols are affixed to the same elements thereof, and the description thereof will be curtailed. With this flash device according to the third preferred embodiment, as shown in FIG. 12, in the engaged state of the leg portion 11 of the flash device, the actuation shaft 21B is pressed in the downwards direction by the first plate spring 41, while it is pressed in the upward direction by the second plate spring 53.

And thus the actuation shaft 21B is securely supported by the support member 37. It should be understood that, although in the above explanation of the preferred embodiments of the present invention, by way of example, the standard potential line was described as being connected to the shift member 39, the present invention is not to be considered as being limited to this type of structure; for example, it would be possible for the leg portion main body 13 to be made from a metallic material which was electrically conducting, and for the standard potential line to be connected to the attachment portion 13c of this leg portion main body 13.

Explanation of the Standard Electrical Potential

Figure 13:
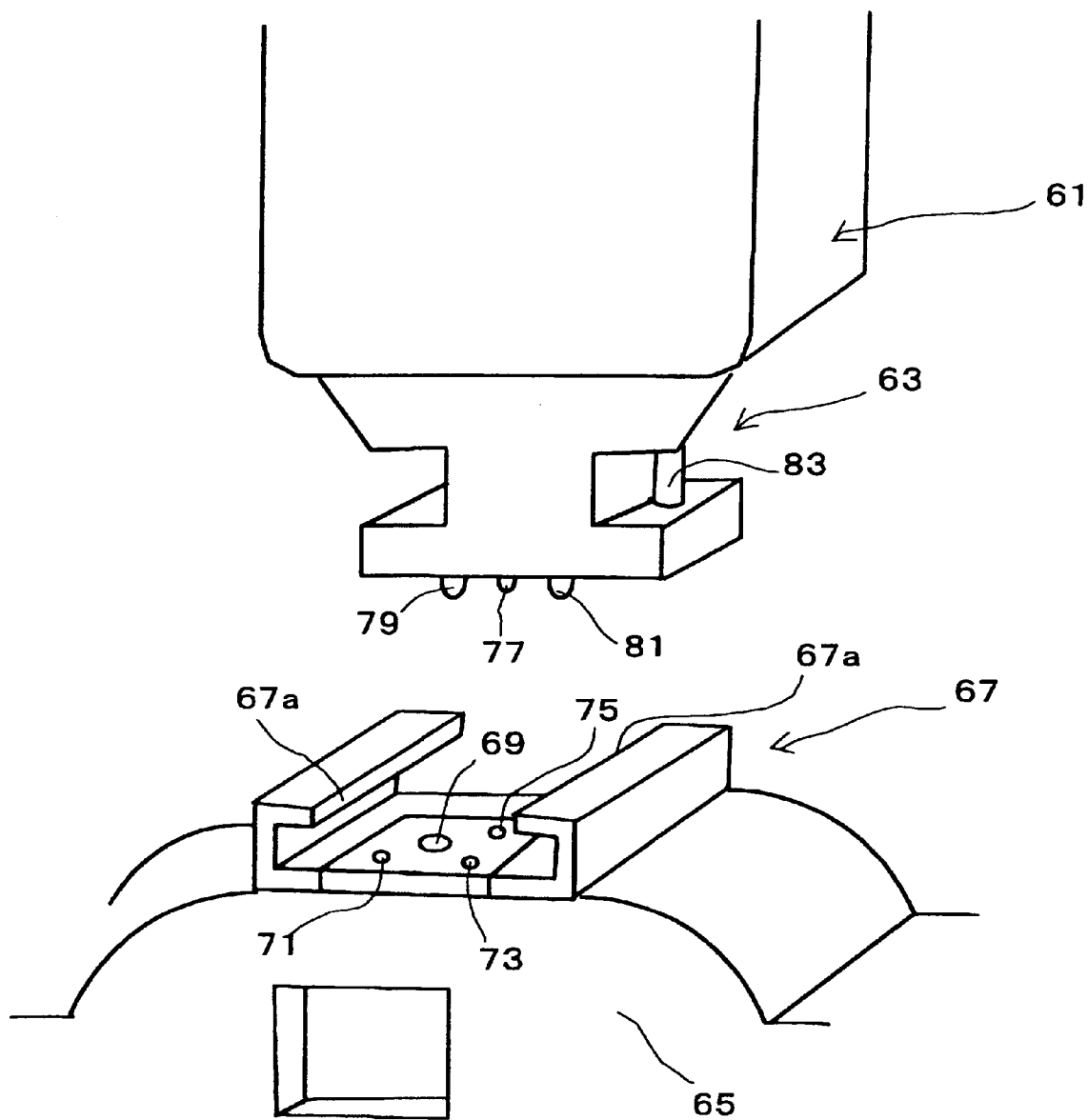
FIG. 13 is a perspective view showing a flash device and a hot shoe according to a prior art.

In the following, the detailed reasons will be explained for making it possible securely to establish a common standard or reference electrical potential for the camera and the flash device in the preferred embodiments of the present invention disclosed above. FIG. 13 is a figure showing a leg portion 63 of a prior art type flash device 61, and a hot shoe 67 on the side of a camera 65.

In the hot shoe 67 on the side of the camera 65, as well as a contact point 69 (the X contact point) for transmitting a light emission command signal to the flash device 61 from the camera 65, there are also provided contact points (71, 73, and 75) for transmitting various items of information from the side of the camera 65. On the side of the flash device 61, it is per se known to provide movable pins (77, 79, and 81) for electrically connecting to these contact points.

Figure 14:
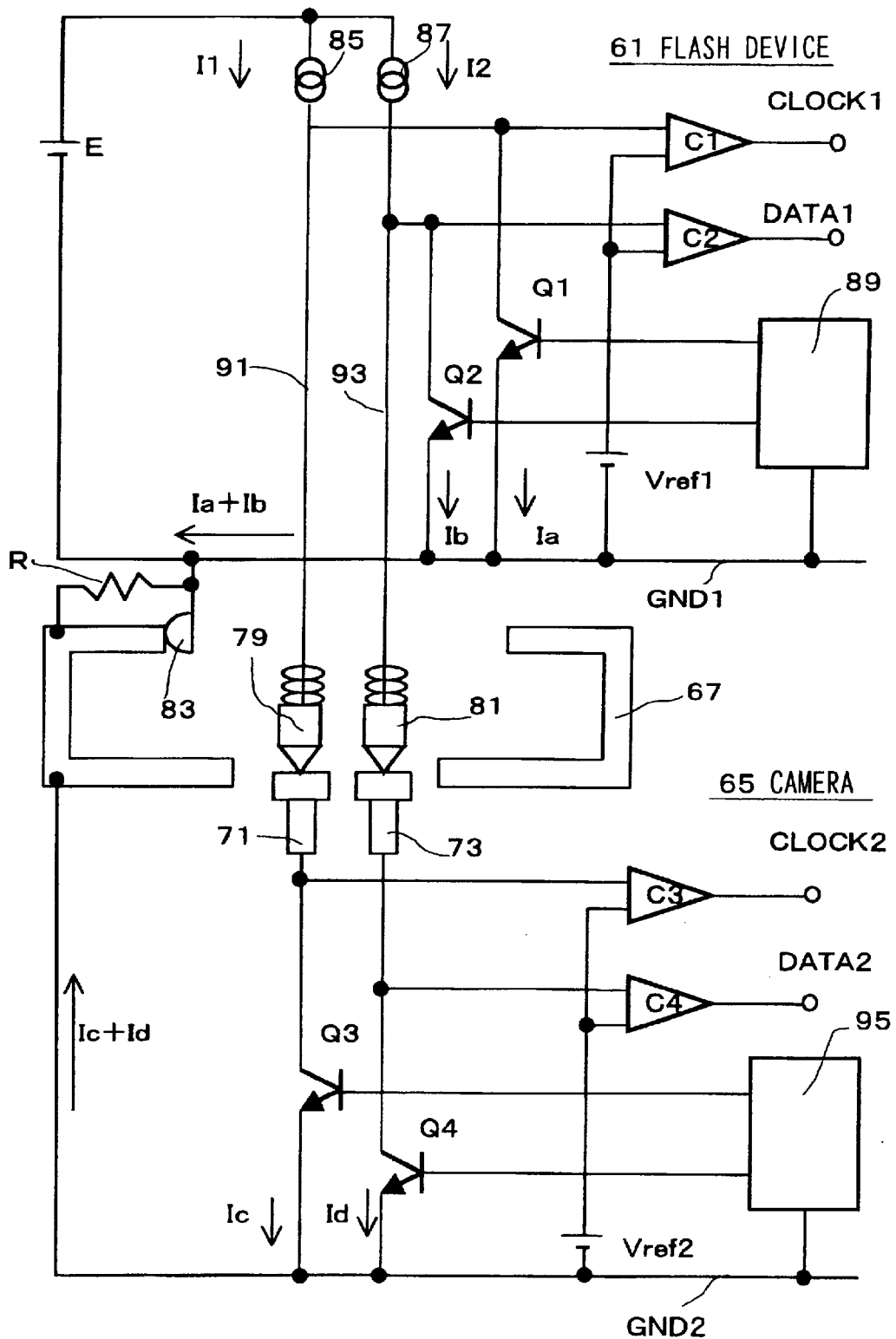
FIG. 14 is a circuit diagram showing a communication circuit between a flash device and a camera.

When the flash device 61 is mounted to the camera 65 by a per se known method, the respective contact points are electrically connected to the pins, and a circuit such as that shown in FIG. 14 is established. At this time, the X contact point 69 on the side of the camera 65 is connected to the pin 77 on the flash device 61, and, when the shutter release of the camera 65 is operated, a command is issued for the flash device 61 to emit light. In the same manner, the pin 79 of the flash device 61 is connected to the contact point 71 on the side of the camera 65, and the pin 81 on the flash device side is connected to the contact point 73 on the camera side.

Springs 83 are disposed at the side surfaces on both sides of the leg portion 63 of the flash device 61, and, when the flash device 61 is mounted to the hot shoe 67 of the camera 65, their spring force contacts them against the corresponding side surfaces 67a of the hot shoe 67. These springs 83 and the hot shoe 67 are respectively connected to the standard electrical potentials of the flash device 61 and the camera 65.

The pin 79 and the contact point 71 constitute a clock signal line, and transmit a standard clock signal when serial communication is being performed between the flash device 61 and the camera 65. Furthermore, the pin 80 and the contact point 73 constitute a data line, and perform transmission and reception of serial data between the flash device 61 and the camera 65, by this data line being set to high level or low level in synchrony with the standard clock signal.

And, for example, the focal length of a zoom lens which is fitted to the camera 65 is transmitted from the camera 65 to the flash device 61, and thereby the illumination angle of the flash device 61 is set automatically. The following discussion relates to the situation when serial data is being sent from the flash device 61 to the camera 65. In FIG. 14 the symbol E denotes a power source for the flash device 61, which generates constant electrical currents I1 and I2 by using current sources 85 and 87.

The reference symbol 89 denotes a signal transmission circuit, and its output drives transistors Q1 and Q2. The collectors of these transistors Q1 and Q2 are respectively connected to a clock signal line 91 and a data line 93, and, when the transistors Q1 and Q2 are turned on, the constant electrical currents I1 and I2 in each line are connected to the standard electrical potential GND1, so that low level is set. Furthermore, when the transistors Q1 and Q2 are turned off, the lines go to high level. By doing this, the flash device 61 outputs a digital signal to the clock signal line 91 and to the data line 93. At this time, when the transistors Q1 and Q2 become turned on, the electrical current Ia (=I1) flowing through the transistor Q1 and the electrical current Ib (=I2) flowing through the transistor Q2 are fed back to the power source E via the standard electrical potential GND1 of the flash device 61.

The clock signal line 91 is inputted to a voltage comparator C3 via the pin 79 and the contact point 71. The data line 93 is inputted to another voltage comparator C4 via the pin 80 and the contact point 73. At this time, a signal transmission circuit 95 on the side of the camera 65 goes into the signal reception state, and transistors Q3 and Q4 which are connected to its output remain in the turned off state just as they are.

The signals on the clock signal line 91 and the data line 93 are inputted to the voltage comparators C3 and C4 and are compared thereby with a comparison reference voltage Vref2 which has been set in advance, and if they are higher than the comparison reference voltage Vref2 then they are deemed to be H (high) signals while on the other hand if they are lower than the comparison reference voltage Vref2 then they are deemed to be L (low) signals; and the resulting signals are outputted as the signals CLOCK2 and DATA2. These signals CLOCK2 and DATA2 are thereafter processed by a microcomputer which is not shown in the figures.

Next, the operation when transmitting serial data from the camera 65 to the flash device 61 will be described. When serial data is to be transmitted from the camera 65 to the flash device 61, then the signal transmission circuit 89 on the side of the flash device 61 goes into the non operational state, and the transistors Q1 and Q2 go into the turned off state.

Furthermore, the signal transmission circuit on the side of the camera 65 goes into the transmitting state, and the transistors Q3 and Q4 which are connected thereto change repeatedly between the turned on state and the turned off state according to the contents of the data to be transmitted, so that signals which vary between high level and low level are outputted to the clock signal line 91 and the data line 93. The voltage comparators C1 and C2 on the side of the flash device 61 operate in an identical manner, and thereby the voltages on the clock signal line 91 and the data line 93 are discriminated as H (high) level or L (low) level, and are processed as information by the microcomputer which is not shown in the figures.

When the transistors Q3 and Q4 become turned on, the electrical current Ic (=I1) from the clock signal line 91 and the electrical current Id (=I2) from the data line 93 are fed to the standard electrical potential GND2 of the camera 65. This electrical current Ic+Id is fed back to the power source E of the flash device 61 from the hot shoe 67 via the springs 83.

Accordingly, a contact potential is generated by the flow of the electrical current Ic+Id through the contact resistance R between the hot shoe 67 and the springs 83. When the flash device 61 receives serial data from the camera 65, a comparison reference voltage Vref1 is used, taking the standard electrical potential GND1 of the flash device 61 as a standard.

Figure 15:
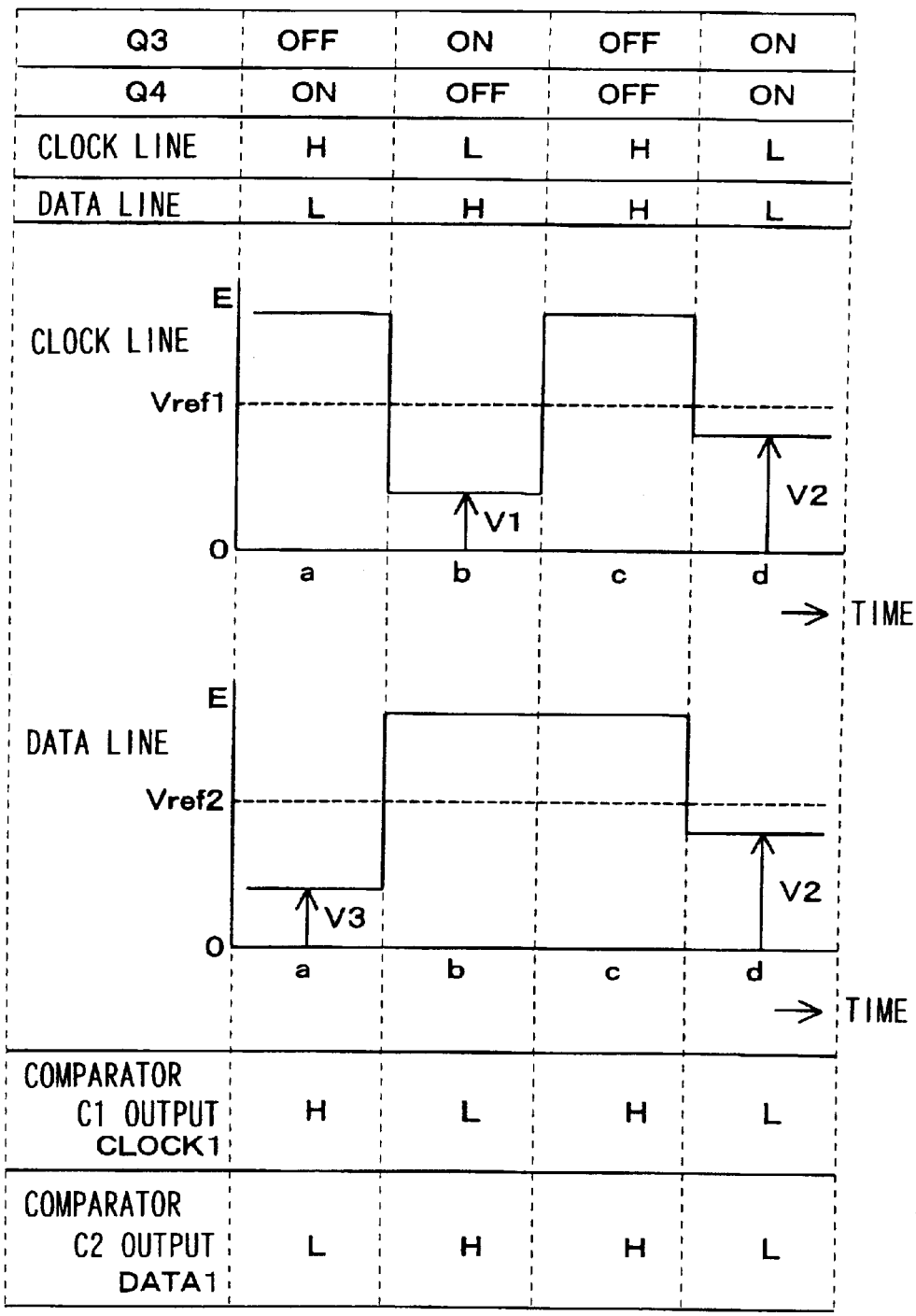
FIG. 15 is an explanatory figure showing changes of voltage upon a clock signal line and a data signal line of the FIG. 14 circuit with time.

Due to this, if the contact resistance R is large, the contact potential becomes high, and it may occur that the comparators C1 and C2 operate erroneously in recognizing low level signals as high level signals. FIG. 15 shows an example of changes of the voltages upon the clock signal line 91 and the data line 93 with time.

The clock signal is generated by the transistor Q3 repeatedly alternating over time between turning off (OFF) and turning on (ON). When Q3 is turned off the clock signal is H (high) level, while when Q3 is turned on the clock signal is L (low) level, and this signal is fed to the clock signal line 91.

When in the same manner the transistor Q4, for example, changes with time from turning on (ON) to turning off (OFF), then remains turning off (OFF), and then changes back to turning on (ON), a signal L→H→H→L is outputted to the data line 93. The changes of the signals upon the clock signal line 91 and the data line 93 at each of the time points a→b→c→d are shown in FIG. 15.

At the time point a, since the transistor Q4 is turned on (ON), due to the flow of the electrical current Id (=I2) through the contact resistance R, the low level of the data line 93 is not exactly zero, but a voltage V3 (=Id*R=I2*R) is generated. Furthermore, the clock signal line 91 is at high level, since the transistor Q3 is turned off (OFF).

At the time point b, since the transistor Q3 is turned on (ON), due to the flow of the electrical current Ic (=I1) through the contact resistance R, the low level of the clock signal line 91 is not exactly zero, but a voltage V1 (=Ic*R= I1*R) is generated; and also the data line 93 is at high level, since the transistor Q4 is turned off (OFF).

Moreover, at the time point c, the contact resistance R has no influence, since the transistors Q3 and Q4 are both turned off (OFF), and accordingly both the clock signal line 91 and the data line 93 are at high level. And, at the time point d, since the transistors Q3 and Q4 are both turned on (ON), an electrical current (Ic+Id) (=I1+I2) is flowing through the contact resistance R, and accordingly the level of both the clock signal line 91 and the data line 93 is not exactly zero, but a voltage V2 (=(Ic+Id)*R=(I1+I2)*R) is generated.

Since in the situation shown in FIG. 15 the contact resistance R is relatively small, and accordingly the voltages which are generated by the electrical currents I1 and I2 and the electrical current (I1+I2) when they flow are smaller than the comparison reference voltage Vref1, accordingly it never happens that the comparators C1 and C2 detect low level mistakenly.

However, if the contact resistance R should undesirably become relatively high, and the voltages of I1*R, I2*R or (I1+I2)*R become greater than the comparison reference voltage Vref1, then it may happen that the low level signals are mistakenly recognized as high level signals. And, in such a case, serial communication from the camera 65 to the flash device 61 becomes impossible.

The contact resistance R changes according to the state of the contact between the springs 83 and the hot shoe 67. If the pressing force of the springs 83 is high, the contact resistance R is correspondingly low, while if the pressing force is low, the contact resistance R becomes high. Furthermore, the contact resistance R also changes due to the quality of the shine upon the surfaces of the springs 83 and the hot shoe 67, and according to the oxidization states thereof.

Yet further, often the contact resistance increases due to wearing out when repeatedly fitting the flash device 61 to the camera 65 and removing it, and this can make serial communication from the camera 65 to the flash device 61 impossible. In the example shown in FIG. 14, when the flash device 61 turns the transistors Q1 and Q2 ON and OFF in order to communicate with the camera 65, no problems arise with serial communication, since the electrical currents Ia and Ib which flow through these transistors Q1 and Q2 do not flow through the contact resistance R.

However, in the FIG. 14 circuit, the electrical current sources 85 and 87 in the clock signal line 91 and the data line 93 are provided on the side of the flash device 61. In this case, as previously explained, when serial communication takes place from the camera 65 to the flash device 61, the problem of failure of serial communication may occur due to the signal electrical current flowing through the contact resistance R. It should be understood that, if these electrical current sources for the clock signal line and the data signal line are provided on the side of the camera 65, then, conversely, the problem of failure of serial communication may occur during serial communication from the flash device 61 to the camera 65.

However, with the present invention, the projecting portions 39e of the shift member 39 which is provided to the leg portion 63 of the flash device 61 are contacted with a strong pressure against the inner wall surfaces of the hot shoe 19 as the projecting portions 39e eats into the inner wall surfaces of the hot shoe 19. Accordingly, not only does it become possible to fix them together mechanically strongly, but also, even if an oxide layer of high electrical resistance is present upon one or both of these members it is possible to obtain a good contact by breaking this layer.

As a result problems with serial communications do not occur, because the contact resistance R is kept low.

Although, in the above description of the various preferred embodiments of the present invention, the invention was described in terms of its application to secure mounting of a flash device onto the hot shoe 19 of a camera, the present invention is not to be considered as being limited to this application thereof. It would also be possible to apply the present invention in the case of fitting some other camera accessory to a camera. Furthermore, the present invention is not necessarily to be considered as being limited to the case of fixing an accessory to a camera; it could be applied to the fixing of any accessory to any device. In other words, it is possible to apply the present invention to any device which is mounted to an accessory shoe which is provided to a main device. In concrete terms, it is possible to apply the present invention to a fitting mechanism portion (a leg portion) for fitting to an accessory shoe of any device. In such a case, the above described hot shoe 19 should be replaced by the accessory shoe which is provided to the main device. Furthermore, the concept of a hot shoe should be understood as being included in the general concept of an accessory shoe, with contact points for a flash device or the like being included in such an accessory shoe.

What is claimed is:

1. A device that is to be fitted to an accessory shoe provided to a main device, comprising:
    an insertion portion that is inserted into the accessory shoe;
    a shift member;
    an actuation member; and
    a shift device that shifts the shift member according to actuation of the actuation member, wherein
        the shift device: presses a portion of the shift member against an inner wall surface of the accessory shoe according to actuation of the actuation member, when the insertion portion is fixed after insertion in the accessory shoe; and releases this pressing of the portion of the shift member against the inner wall surface of the accessory shoe according to actuation of the actuation member in order to remove the insertion portion from the accessory shoe.

2. A device according to claim 1, wherein:
    the actuation member is provided so as to be rotatable; and
    the shift device comprises a biasing member that biases the shift member towards the accessory shoe, and an actuation shaft that is linked to and is rotated by the actuation member and has a displacement portion; and, due to shifting of the displacement portion according to rotation of the actuation shaft, shifts the shift member away from the accessory shoe to press the portion of the shift member against an upper inner wall surface of the accessory shoe.

3. A device according to claim 2, wherein the shift device further comprises a support member to which a tip portion of the actuation shaft is engaged and which is contacted to an upper surface of the insertion portion.

4. A device according to claim 1, wherein:
the actuation member is provided so as to be rotatable; and
the shift device comprises a biasing member that biases the shift member away from the accessory shoe, and an actuation shaft that is linked to and is rotated by the actuation member and has a displacement portion, and, due to shifting of the displacement portion according to rotation of the actuation shaft, shifts the shift member towards the accessory shoe to press the portion of the shift member against a lower inner wall surface of the accessory shoe.

5. A device according to claim 1, wherein the portion of the shift member comprises a projecting portion that contacts an inner wall surface of the accessory shoe when being pressed.

6. A device according to claim 1, wherein:
the shift member comprises a first shift member and a second shift member;
the actuation member is provided so as to be rotatable; and
the shift device comprises a first biasing member that biases the first shift member towards the accessory shoe, a second biasing member that biases the second shift member away from the accessory shoe, and an actuation shaft that is linked to and is rotated by the actuation member and has a displacement portion, wherein:
the shift device, due to shifting of the displacement portion according to rotation of the actuation shaft, shifts the first shift member away from the accessory shoe to press a portion of the first shift member against an upper inner wall surface of the accessory shoe, and shifts the second shift member towards the accessory shoe to press a portion of the second shift member against a lower inner wall surface of the accessory shoe.

7. A device according to claim 6, wherein the shift device further comprises a support member to which a tip portion of the actuation shaft is engaged and which is contacted to an upper surface of the insertion portion.

8. A camera accessory that is to be fitted to an accessory shoe provided to a camera, comprising:
an insertion portion that is inserted into the accessory shoe;
a shift member;
an actuation member; and
a shift device that shifts the shift member upon actuation of the actuation member, wherein
the shift device: presses a portion of the shift member against an inner wall surface of the accessory shoe according to actuation of the actuation member, when the insertion portion is fixed after insertion in the accessory shoe; and releases this pressing of the portion of the shift member against the inner wall surface of the accessory shoe according to actuation of the actuation member in order to remove the insertion portion from the accessory shoe.

9. A device according to claim 8, wherein the camera accessory is a flash device.

10. A device according to claim 9, wherein the shift member is formed from a metallic material that is electrically conductive, and a standard potential line is connected to the shift member.

* * * * *

UNITED STATES PATENT AND TRADEMARK OFFICE
CERTIFICATE OF CORRECTION

PATENT NO.       : 6,546,204 B2
DATED            : April 8, 2003
INVENTOR(S)      : Nobuyoshi Hagiuda et al.

It is certified that error appears in the above-identified patent and that said Letters Patent is hereby corrected as shown below:

<u>Title page,</u>
Add:
-- [30]   Foreign Application Priority Data
   Jan. 30, 2001    Japan    2001-021123. --

Signed and Sealed this

Twenty-eighth Day of October, 2003

JAMES E. ROGAN
*Director of the United States Patent and Trademark Office*